Nov. 4, 1924.
C. B. McDOWELL
1,514,553
ANTISKID DEVICE
Filed July 30, 1923    2 Sheets-Sheet 1
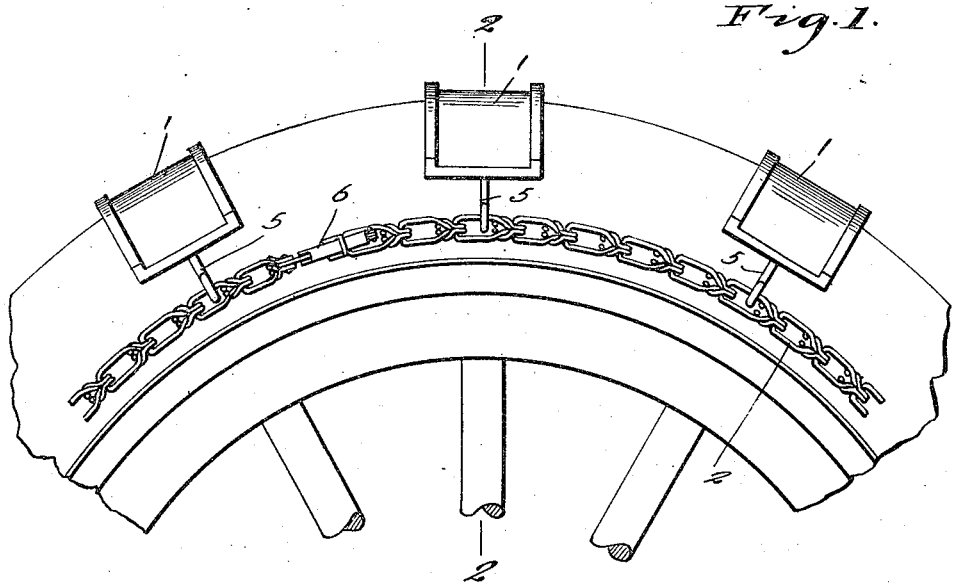
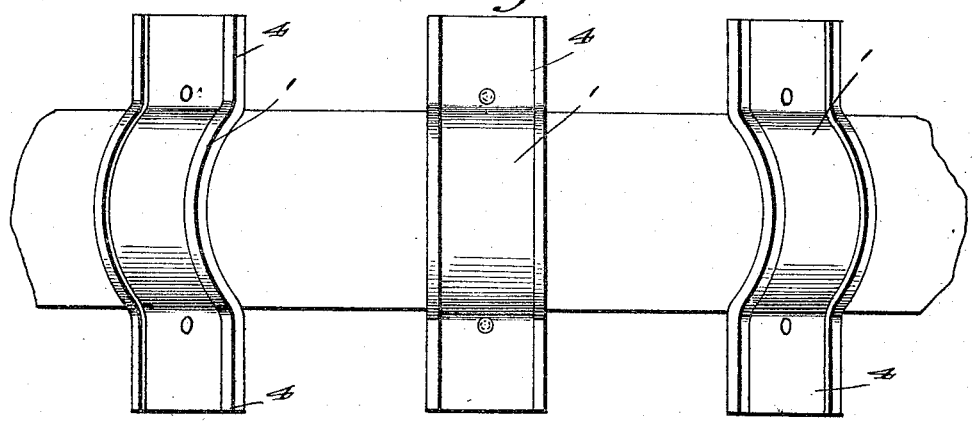
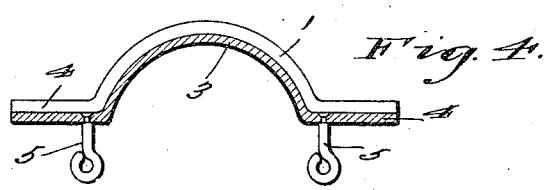
C. B. McDowell
INVENTOR
BY Victor J. Evans
ATTORNEY
WITNESSES Nov. 4, 1924.
C. B. McDOWELL
ANTISKID DEVICE
Filed July 30, 1923
1,514,553
2 Sheets-Sheet 2
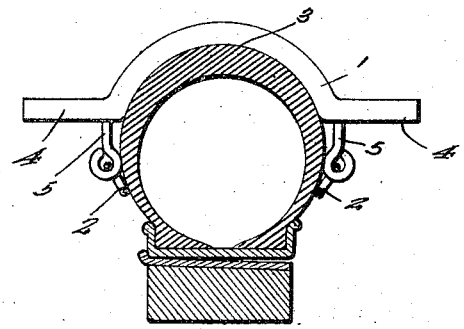
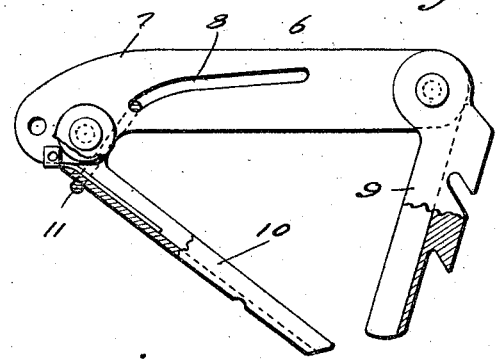
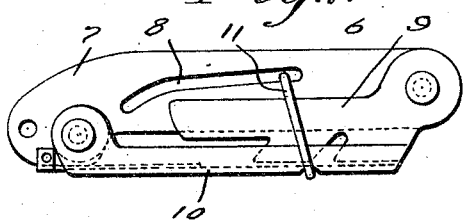
C. B. McDowell INVENTOR Patented Nov. 4, 1924.

1,514,553

UNITED STATES PATENT OFFICE.

CLARE B. McDOWELL, OF FLINT, MICHIGAN.

ANTISKID DEVICE.

Application filed July 30, 1923. Serial No. 654,740.

*To all whom it may concern:*

Be it known that I, CLARE B. MCDOWELL, a citizen of the United States, residing at Flint, in the county of Genesee and State of Michigan, have invented new and useful Improvements in Antiskid Devices, of which the following is a specification.

This invention relates to an anti-skid device, the general object of the invention being to provide lugs which are formed with side extensions with means for attaching them to a wheel so that the vehicle can travel through sand and mud without difficulty.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a wheel showing my invention in place.

Figure 2 is a section on line 2—2 of Figure 1, the lug being shown in elevation.

Figure 3 is an edge view.

Figures 4 and 5 are detail views of one of the lugs.

Figures 6 and 7 are detail views of one of the fastening hooks.

As shown in these views the anti-skid device is provided with a plurality of lugs 1 which are connected together by the side chains 2. Each lug is formed with a central curved part 3 for engaging the tread of a tire and with the straight end portions 4 which project beyond the walls of the tire. Each lug is preferably formed of channel iron with its edges slightly rounded so as to prevent injury to the tire. Each straight part 4 carries an eye bolt 5 which engages a link of a side chain. The ends of the side chains are connected together by the hooks 6, each hook consisting of a member 7 which is fastened to one end of the chain and which is provided with a slot 8. A notched lever 9 is pivoted to the free end of this member 7, one of its notches being adapted to receive a link at the other end of the chain. A third member 10 is pivoted to the member 7 and is adapted to overlap the member 9 to hold the link in the notch. The parts are held in locking position by means of the link 11 which is slidably mounted in the slot 8 of the member 7. By this means the ends of the chains are firmly connected together and the slack is taken out of the chain when the member 9 is swung downwardly.

From the foregoing it will be seen that my improved lugs will engage a considerable amount of road surface so as to provide traction in sandy and muddy ground. The manner in which the chains are connected with the lugs permit the device to be used on disc wheels as well as on spoke wheels.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An anti-skid device of the class described comprising a plurality of lugs, each formed of channel iron and provided with a curved central part for engaging the tread of the tire and straight end portions extending laterally from the sides of the tire, side chains and means for connecting the straight end portions with the side chains.

2. An anti-skid device of the class described comprising a plurality of lugs, each formed of channel iron and provided with a curved central part for engaging the tread of the tire and straight end portions, eye bolts carried by the end portions and side chains connected with the eye bolts.

In testimony whereof I affix my signature.

CLARE B. McDOWELL.